United States Patent
Berlyant et al.

(10) Patent No.: US 8,321,454 B2
(45) Date of Patent: Nov. 27, 2012

(54) DOUBLE MAP REDUCE DISTRIBUTED COMPUTING FRAMEWORK

(75) Inventors: Mikhail Berlyant, Tarzana, CA (US); Daniel Stephen Rule, Santa Monica, CA (US); Christopher Edward Miller, Los Angeles, CA (US); Cynthia Lok, Cerritos, CA (US)

(73) Assignee: MySpace LLC, Beverly Hills, CA (US)

( * ) Notice: Subject to any disclaimer, the term of this patent is extended or adjusted under 35 U.S.C. 154(b) by 245 days.

(21) Appl. No.: 12/882,058

(22) Filed: Sep. 14, 2010

(65) Prior Publication Data

US 2011/0066649 A1 Mar. 17, 2011

Related U.S. Application Data

(60) Provisional application No. 61/242,309, filed on Sep. 14, 2009.

(51) Int. Cl.
*G06F 7/00* (2006.01)
*G06F 17/30* (2006.01)

(52) U.S. Cl. ........ 707/770; 707/790; 707/802; 707/803; 709/201; 709/202

(58) Field of Classification Search .................. 707/736, 707/737, 770, 790, 802, 803, 999.1; 709/201, 709/202
See application file for complete search history.

(56) References Cited

U.S. PATENT DOCUMENTS

| | | | |
|---|---|---|---|
| 6,393,426 B1 * | 5/2002 | Odom et al. | 707/999.1 |
| 7,454,398 B2 | 11/2008 | Kehlenbeck et al. | |
| 7,464,090 B2 | 12/2008 | Betz | |
| 7,475,071 B1 | 1/2009 | Liu et al. | |
| 7,523,123 B2 | 4/2009 | Yang et al. | |
| 7,555,471 B2 | 6/2009 | Hogue et al. | |
| 7,917,495 B1 * | 3/2011 | Chapman et al. | 707/713 |
| 7,945,581 B2 * | 5/2011 | Bayliss et al. | 707/770 |
| 2008/0120314 A1 * | 5/2008 | Yang et al. | 707/101 |
| 2009/0055370 A1 * | 2/2009 | Dagum et al. | 707/4 |
| 2010/0083194 A1 * | 4/2010 | Bagherjeiran et al. | 716/2 |

OTHER PUBLICATIONS

Yang et al., "Map-Reduce-Merge: Simplified Relational Data Processing on Large Clusters", ACM, Jun. 2007, pp. 1029-1040. Download: http://dl.acm.org/citation.cfm?id=1247602.*
Rafique et al., "CellMR: A Framework for Supporting MapReduce on Asymmetric Cell-Based Clusters", ACM, 2009, pp. 1-10. Download: http://dl.acm.org/citation.cfm?id=1586640.1587578.*
MapReduce, Wikipedia—http://en.wikipedia.org/wiki/MapReduce, page last modified Aug. 27, 2009.
Endianness, Wikipedia—http://en.wikipedia.org/wiki/Endianness, page last modified Sep. 1, 2010.

* cited by examiner

*Primary Examiner* — Hares Jami
(74) *Attorney, Agent, or Firm* — Gates & Cooper LLP (57) ABSTRACT

A method, apparatus, system, article of manufacture, and data structure provide the ability to perform a sorted map-reduce job on a cluster. A cluster of two or more computers is defined by installing a map-reduce framework onto each computer and formatting the cluster by identifying the cluster computers, establishing communication between them, and enabling the cluster to function as a unit. Data is placed into the cluster where it is distributed so that each computer contains a portion of the data. A first map function is performed where each computer sorts their respective data and creates an abstraction that is a representation of the data. The abstractions are exchanged and merged to create complete abstraction. A second map function searches the complete abstraction to redistribute and exchange the data across the computers in the cluster. A reduce function is performed in parallel to produce a result.

30 Claims, 2 Drawing Sheets

DOUBLE MAP REDUCE DISTRIBUTED COMPUTING FRAMEWORK

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

U.S. Provisional Patent Application Ser. No. 61/242,309, entitled "DOUBLE MAP REDUCE DISTRIBUTED COMPUTING FRAMEWORK", by Mikhail Berlyant, Daniel Stephen Rule, Christopher Edward Miller, and Cynthia Lok, filed on Sep. 14, 2009.

This application is related to the following co-pending and commonly-assigned patent application, which application is incorporated by reference herein:

U.S. patent application Ser. No. 12/882,049, entitled "DEBUGGING A MAP-REDUCE APPLICATION ON A CLUSTER", by Mikhail Berlyant, Daniel Stephen Rule, Christopher Edward Miller, and Cynthia Lok, filed on Sep. 14, 2010.

BACKGROUND OF THE INVENTION

1. Field of the Invention

The present invention relates generally to distributed computing, and in particular, to a method, apparatus, system, and article of manufacture for utilizing a map-reduce software framework to perform computation processing. The invention relates to optimally leverage distributed computing hardware for data mining by developing a highly reusable infrastructure that allows developers an easy way to execute map-reduce functionality over an entire cluster. Thus, the invention turns multiple computers into a single problem solving machine through parallel distributed paired data.

2. Description of the Related Art

Map-reduce is a software framework used to support distributed computing on large data sets on clusters of computers (nodes). There are two steps as part of a map-reduce framework—"map" and "reduce". During the "map" step, a master node takes input, chops it up into smaller sub-problems and distributes those to worker nodes. The worker node processes the smaller problem and passes the answer back to the master node. During the "reduce" step, the master node takes the answers to all the sub-problems and combines them in a way to get the output (the answer to the problem it was originally trying to solve). Many problems exist in the prior art map-reduce implementations: (1) they are often restricted to a particular operating system such as Linux™; (2) they are difficult to use without substantial experience in a particular programming language; (3) they require a preexisting knowledge of the master computer, the functionality of the master computer, and the use of the master computer in the cluster; and (4) processing may not be evenly distributed across all machines in a cluster. These problems may be better understood with a more detailed explanation of prior art map-reduce implementations and uses.

Prior art map-reduce implementations are commonly open source and have been primarily limited to a Linux™ operating system environment. While such implementations may be useful, many users and developers are used to the Microsoft™ Windows™ operating system environment and are unable to take advantage of such Linux™-based implementations.

Further, prior art map-reduce technologies often require substantial programming experience in a particular programming language. In addition, the developer is required to maintain a preexisting knowledge base regarding the functionality of all nodes in a cluster (i.e., in order to determine which node should be used to perform a desired function). Also, a single master node must be used as the entry point for accessing and utilizing the functionality provided by a cluster.

Some more specific details regarding map-reduce functions may be useful in better understanding the problems of the prior art. The "map" and "reduce" functions are both defined with respect to data structured in (key,value) pairs. The "map" function takes one pair of data with a type in one data domain, and returns a list of pairs in a different domain. The map function is applied in parallel to every item in the input dataset to produce of list of (key,value) pairs for each call. Thus, the "map" function identifies a set of (key,value) pairs. All of the pairs with the same key from all lists may be collected and grouped together to create one group for each of the different generated keys. The "reduce" function is then applied in parallel to each group, to produce a collection of values in the same domain. Accordingly, the map-reduce function transforms a list of (key,value) pairs into a list of values. During a "map" function, (key,value) pairs are identified, and during the "reduce" function, like keys are brought together and merged to produce a result.

However, as part of the execution of the "map" and "reduce" functions, the data may be skewed such that a larger portion of processing may be performed by a particular machine in the cluster. Further, a single master node is responsible for executing and controlling the function execution. Examples of various prior art implementations include the Apache™ Hadoop™ project implementation of map-reduce, the Apache™ CouchDB™ project, the Skynet™ open source implementation of Google™'s map-reduce framework, and the Disco™ open-source implementation.

In addition to the above described limitations, the prior art fails to provide the ability to perform cluster based debugging and editing of code/transactions. Accordingly, what is needed is a distributed computer system that enables the easy performance of a map-reduce function on any node in a cluster without requiring a specific master node where data and processing is evenly distributed across a cluster and where cluster based processing/debugging can be utilized.

SUMMARY OF THE INVENTION

One or more embodiments of the invention provide an easy-to-use map-reduce engine that leverages the .NET platform. Embodiments may provide for a Windows™ based engine but it may be utilized in other operating systems/environments. Embodiments may also be .NET friendly while providing functionality available in other map-reduce engines plus further functionality. One or more embodiments of the invention provide:

An engine that is designed natively for Microsoft™ Windows™ servers;
Map-reducer logic that can be developed and debugged on production clusters with a built-in IDE/Debugger;
There is no concept of a "master node", all machines in cluster are equal—any machine in the cluster may be used to perform any supported task;
Intermediate data caching may be enabled for any map-reducer job such that the map-reducer only exchanges delta rather than the entire distributed input file;
Map map-reduce (instead of map-reduce) for sorted map-reducers, provides the ability to allow fully sorted and evenly sorted map-reducers without the map-reduce having to have understanding of the nature of the data or write custom distribution logic. Prior art implementations typically use random sampling for fully sorted map-reducers that work most of the time but often skew the data overloading part of the cluster when the randomness fails to be proportional. Embodiments of the invention apply the map phase twice, the first pass of map fully yet quickly analyses the data so that the exchange-phase exchanges precisely equivalent ranges of (key,value) pairs to every machine in the cluster;

Three SQL interfaces: ADO.NET Data Provider, Microsoft™ Windows™ based SQL interface and command-line based SQL interface;

Code that allocates on the heap automatically colored in red;

IEEE doubles (data) between a map and reduce are converted to 9 byte sortable form such that Not-a-Number, Positive Infinity and Negative Infinity are lossless preserved while the double remains byte-wise sortable.

Embodiments of the invention provide many advantages over the prior art. For example, embodiments provide an easy way for .NET software developers to rapidly create applications that process large amounts of data on large clusters. Embodiments provide an easy mechanism to process large amounts of data over a cluster of many machines. Distributed logic may be debugged on a cluster of many machines, and can efficiently sort large amounts of data across an entire cluster. An easy mechanism is used to develop map-reducers, virtually eliminating the learning curve typically incurred by other map-reduce frameworks. Further, since the debugger and IDE are built into the map-reduce framework, map-reduce developers simply log into any machine of a cluster to develop, debug/step through map-reducer logic running in a cluster. In additions, a user may develop a map-reducer to run on an entire cluster, yet steps through the executing logic as it executes on the cluster. The speed at which development of cluster software is exponentially faster than prior art techniques.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide the ability to install/configure a cluster of computers for a distributed computer network and to further utilize a map-reduce function in such a cluster.

The initial problem relates to determining and installing/recognizing all of the machines/computers in a cluster. The second issue is to place data into the cluster. The third issue is to perform and debug a map-reduce function on the data in the cluster. As described above, the prior art has various deficiencies in all three of these areas.

For example, with respect to the third issue, development processes in other map-reduce infrastructures provide for debugging a map-reduce on one's development machine using $3^{rd}$ party tools, setting up a test framework, and uploading the result to a server to determine if the map-reduce function works in the rest of the cluster. Such a series of steps consume time, energy, and are inefficient. One or more embodiments of the invention overcome the problems of the prior art and provide the ability to easily install a cluster followed by a simple, efficient, and easy ability to perform a map-reduce function and debugging such a function while in the cluster.

Three different job types may exist within a map-reduce framework that are supported by one or more embodiments of the invention—map-reduce, local, and remote—each of which is described in further detail below.

Hardware Environment

Figure 1:
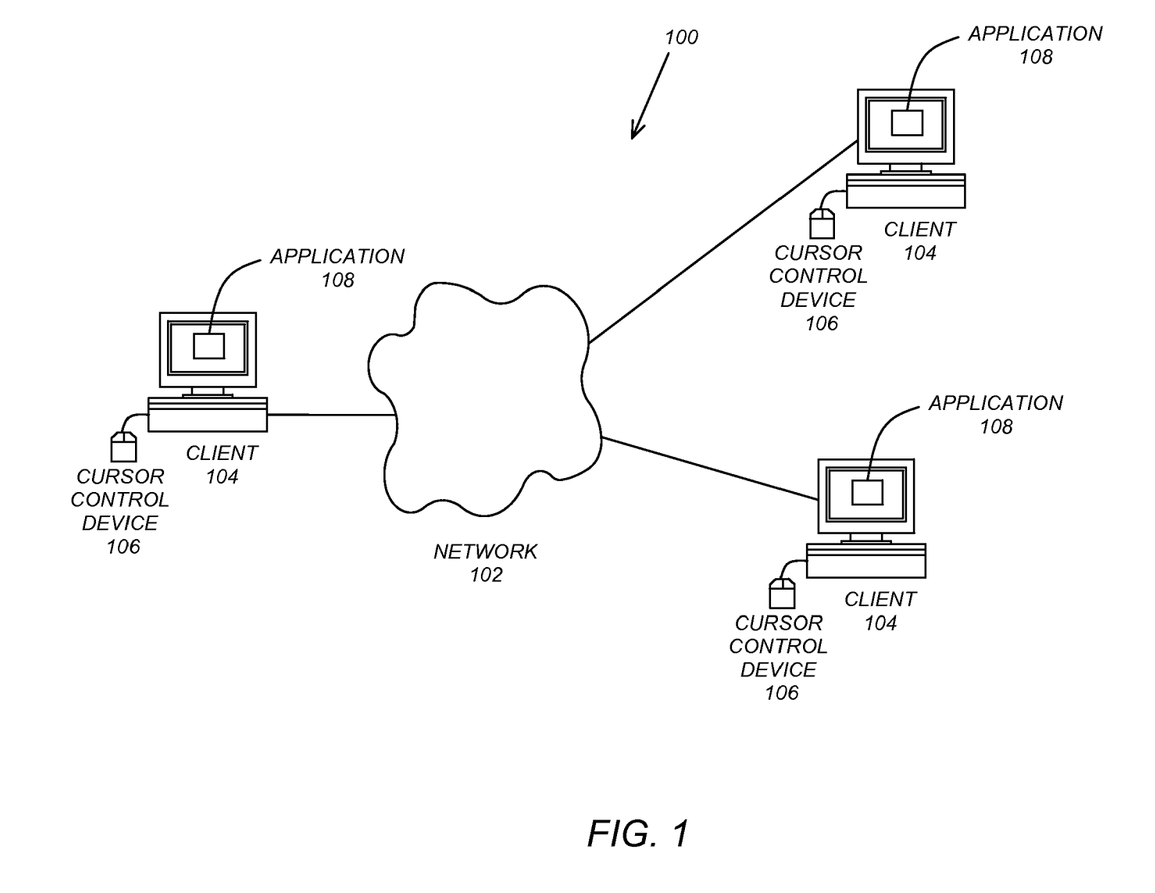
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system using a network 102 to connect (e.g., communicatively couple) client computers 104 to each other to form a cluster 100 of computers. A typical combination of resources may include a network 102 comprising the Internet, LANs, WANs, SNA networks, or the like, and clients/servers 104 that are personal computers or workstations, minicomputers, or mainframes. Additionally, clients 104 may receive input (e.g., cursor location input) and display a cursor in response to an input device such as cursor control device 106. Clients 104 may execute a client application 108 under control of an operating system such as the Microsoft™ Windows™ operating system. Further client application 108 may provide the ability to configure the cluster 100 of computers 104 to function as a single computer to perform a map-reduce function.

In one or more embodiments, instructions implementing the client application 108 are tangibly embodied in a computer-readable medium, e.g., data storage device, which could include one or more fixed or removable data storage devices, such as a zip drive, floppy disc drive, hard drive, CD-ROM drive, DVD drive, tape drive, etc. Further, the client application 108 is comprised of instructions which, when read and executed by computers 104, causes the computers 104 to perform the steps necessary to implement and/or use the present invention. Client application 108 and/or operating instructions may also be tangibly embodied in a memory and/or data communications devices of computers 104, thereby making a computer program product or article of manufacture according to the invention. As such, the terms "article of manufacture" and "computer program product" as used herein are intended to encompass a computer program accessible from any computer readable device or media. Further, embodiments of the invention may be implemented as part of an apparatus, system, or method that provides the cluster based operations described herein. Thus, the invention turns multiple computers 104 into a single problem solving machine through parallel distributed paired data.

Those skilled in the art will recognize that the exemplary environment illustrated in FIG. 1 is not intended to limit the present invention. Indeed, those skilled in the art will recognize that other alternative environments may be used without departing from the scope of the present invention.

Cluster and Data Configuration

As described above, the first/initial step is to configure the computers 104 to join and function as part of the cluster 100. Accordingly, an installer (e.g., MSI™—Microsoft™ Installer) may be executed on each computer 104 that the user desires to be part of the cluster 100. Alternatively, the application can be installed on a single machine 104 with a script that installs the application on the other machines 104 within the cluster 100. Thereafter, the user may RDP (remote desktop) into any machine 104 and utilize a format command that identifies all of the machines 104 in the cluster 100. Once the formatting is complete, the cluster 100 has been established such that all of the computers 104 are connected to each other and the entire cluster 100 can function as a single computer to perform a map-reduce function. In this regard, a developer no longer needs to determine which machine 104 is responsible for a particular job. Instead, the developer can continue utilizing any machine 104 in the cluster 100 and access the entire cluster 100 as a single machine.

Once the cluster 100 has been created, the next step is to place the data into the cluster 100. The data may be placed into the cluster in whatever form it currently exists in. For example, the data may already be distributed across several machines or it may exist in a single machine. Regardless of how the data is distributed, it needs to be identified as belonging to (and transferred into) the cluster 100. To place the data into the cluster 100, the developer logs into the cluster 100 (or uses a machine that is part of the cluster) and issues a "PUT" command while specifying a network path to a file that the developer desires to put into the cluster 100. Accordingly, once on the cluster 100, the developer merely needs to specify the network path identifying the data that should be transferred into the cluster 100. Multiple "PUT" commands may be issued if the data is spread across multiple machines 104.

Once the data is in the cluster 100, a list command performed in the cluster 100 will return the data/file. A user can remote desktop (RDP) into a machine 104 in the cluster 100 and perform cluster-based operations. For example, the user can see all files (data or job files) in the cluster 100.

Map-Reduce Debugging

One or more embodiments of the invention provide the ability to perform and debug a map-reduce function in the cluster 100. As described above, the map function is applied concurrently to all of the data in the cluster with the output being (key,value) pairs. Data is not moved anywhere in the network but is written out into (key,value) pairs on each of the machines 104 simultaneously. Thereafter, data is in both the original form and the (key,value) pairs. With the (key,value) pairs, machines 104 can talk to each other and coordinate regarding the data. The reduce function then groups the results from like keys to produce a desired result.

In prior art implementations, a map-reduce function was performed but a specific master machine 104 with the desired capabilities had to be selected. In addition, there was no way to debug the map-reduce function without debugging on an individual machine 104 using third party tools, setting up a test framework, uploading the function to a server and testing it to determine if the function worked in the rest of the cluster 100.

One or more embodiments of the invention provide the ability to debug a map-reduce function directly in the cluster 100 without the prior art restrictions. In this regard, an IDE (integrated development/design/debugging environment) and debugger are built directly into (e.g., integrated with) the map-reduce framework. Such an integration of functionality exponentially increases the lifecycle of a map-reduce function. Further, rather than performing a function and testing on a single machine 104, the function and testing is now performed on the cluster 100—the user merely RDPs into any machine 104 in the cluster 100 without regard as to the functionality of any particular machine 104.

To edit a function, the developer can RDP onto a machine 104 in the cluster, type "edit" and the name of the job that the user desires to modify/create/debug. Thereafter, an IDE is displayed that allows real-time editing and debugging of the function utilizing the processing capabilities of the entire cluster 100.

Local Job

A local job executes on one core/machine 104 somewhere in the cluster (not necessarily on the current user's/developer's machine 104 and executes a function that is implemented for that machine 104 and is used to orchestrate other jobs (e.g., another map-reduce).

Remote Job

A remote job is similar to a local job in that it can be run on one core/machine 104. However, a remote job has an input (e.g., a stream to an MR.DFS [Map Reduce Distributed File System]) and an output (e.g., a distributed file). Accordingly, a remote job takes a distributed file, streams it to a single core and streams it out to a distributed file. Remote jobs are useful for cases where data resulting from map-reducer is not extremely large but there is a single machine solution for it so it can still be integrated into the one development environment.

Data Exchange Across a Cluster

Once data is mapped across a cluster (e.g., using a PUT command as part of a map-reduce framework), various protocols may be used to exchange the data including a hash based solution "Grouped" solution, hash sorted solution, and foil sorting solution.

In the "Grouped" solution, a cluster 100 is treated as a hash table where keys are hashed to integers. Each machine 104 is responsible for a particular range of integers. Accordingly, the data is not sorted but remains in the same sequence but is grouped and sent to a particular machine based on a hash function.

The hash sorted solution is useful for performing a competitive sort where the first few bytes (e.g., 2 bytes) are examined and used for distribution.

The foil sorting solution is also referred to as Map map-reduce, Double map-reduce, or a full-text search index without sampling that is immune to skewing. In most well known map-reduce frameworks (Prior Full-Text Search Index Techniques), keys of sorted jobs are randomly sampled prior to the exchange phase in order to determine patterns of skewing in keys. The sampled keys are then used to determine which node in the cluster 100 each (key,value) pair will be transferred to during the exchange phase. Assuming the random sample is representative of the entire data set, each node 104 will receive an approximately even range of the (key,value) pairs after all exchange is complete. As each node 104 receives all of its ranged data from the exchange it is sorted and sent into a reducer event. If the reducer simply writes the key value pairs back out, the resulting data set is the text data now fully sorted across the entire cluster 100 with an approximately even portion of the data on each node 104.

However, the prior art full-text search index solutions had various problems. Even the slightest difference in amount of data within each range has a huge impact on the overall performance of a sorted map-reducer execution. Such an impact results because the speed of a map-reducer job is only as fast as the overburdened machines 104 can handle. Speculative computing is often used to prevent a slow-down in execution when there is a disk failure during a map-reducer job, but often just kicks in to compensate for un-even ranges of data across the cluster 100.

One or more embodiments of the invention provide a way to ensure evenly sized ranges of sorted data across a cluster 100; thus greatly improving the performance of sorting highly skewed text data across a cluster 100. Initially, similar solutions to other map-reducer engines were utilized by randomly sampling keys, constructing a b-tree, and using the b-tree to determine which range each (key,value) pair belongs at the end of each map iteration. Such initial approaches provided satisfactory results but the overall performance was only as good as the sampling. If the sampling ended up being poor, the ranges would not be evenly sized and the job the map-reducer would hang on the last few nodes 104 to finish sorting their over-sized workload. In a competitive sort solution, a simple array of all combinations of two bytes can work for completely random keys, but results are poor for skewed text data, such as written words.

Accordingly, based on the deficiencies of the above approaches, embodiments of the invention eliminated random-sampling from sorted map-reducer jobs. Instead, embodiments of the invention perform the map phase twice. The cost of doing the map phase twice is insignificant, compared to cost of any machine 104 getting too much data during the exchange phase of a sorted map-reducer.

The first iteration of the map (i.e., map1), reads the input of disk but does not write it back out, rather it constructs what is referred to as a foil or an abstraction that is representative of all of the data on that machine/disk 104. The foil, much like aluminum foil, dents and crinkles as the map1 phase scans the data. The end result is an ultra small (e.g. a few kilobytes per terabyte of data) but highly accurate representation of the skewing in the data. For a very simple example, if half of the keys are right padded and half of the keys are left padded, then half of the foil will be right padded and half of the foil will be left padded. Before the "real" map phase (map2), all nodes 104 in the cluster 100 exchange their ultra small but highly accurate foil. Each machine 104 merges their ultra small foil until all machines 104 have the same foil. When the second iteration of the map (i.e., map2) begins, the foil is used instead of random samples to determine which range each (key,value) pair belongs.

During the first map phase, (key,value) pairs are not saved but analyzed such that during the data distribution (or second map phase), the data can be sorted across the cluster in an even way. During the data distribution phase, the (key,value) pairs are used to place data into buckets/groups based on the foil.

Logical Flow of Map-Map-Reduce

Figure 2:
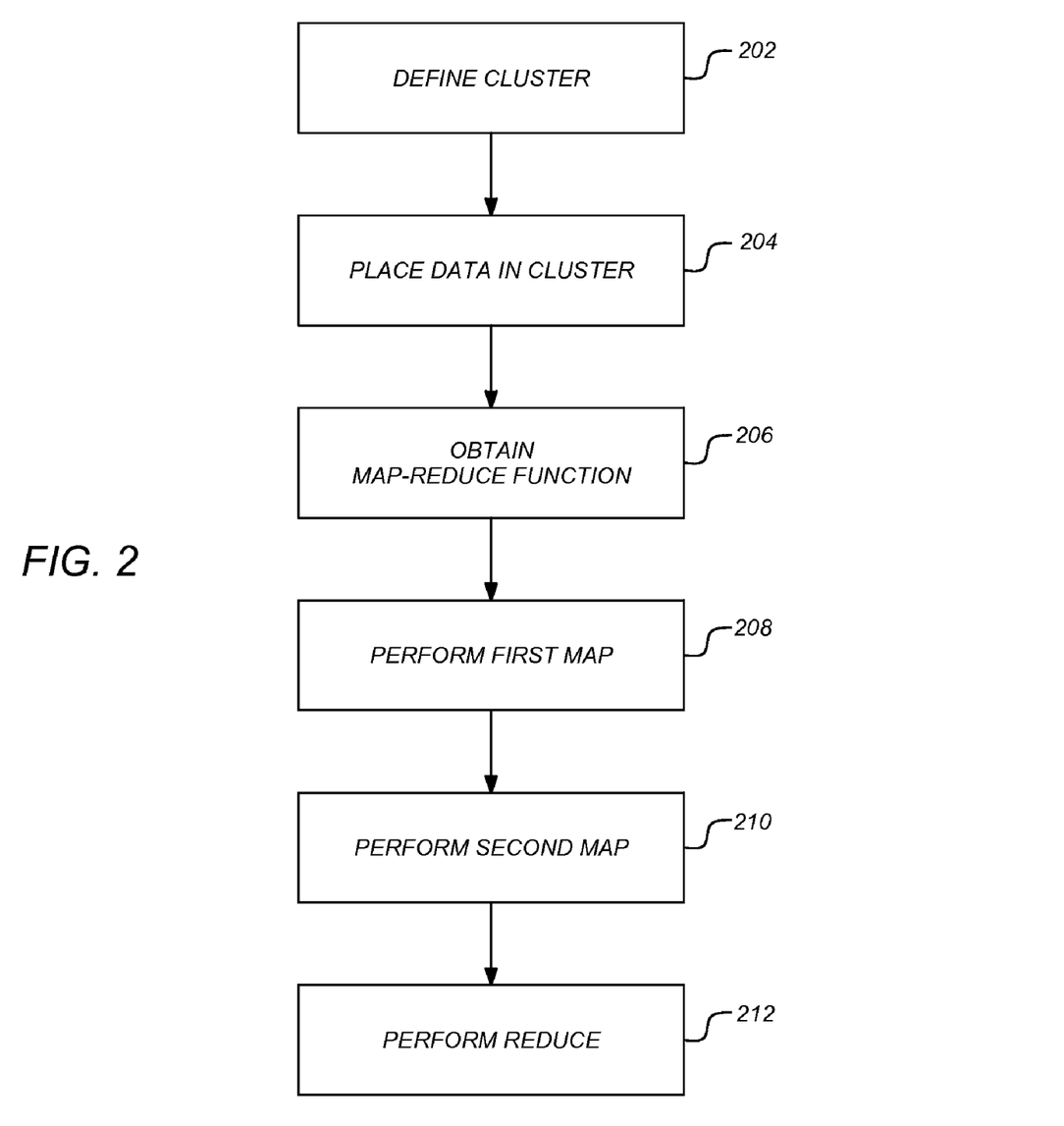
FIG. 2 is a flow chart illustrating the logical flow for performing a sorted map-reduce job on a cluster in accordance with one or more embodiments of the invention.

FIG. 2 is a flow chart illustrating the logical flow for performing a sorted map-reduce job on a cluster in accordance with one or more embodiments of the invention.

At step 202, a cluster of two or more computers is defined. To define the cluster, a map-reduce framework is installed onto each computer that is going to be part of the cluster. The cluster is then formatted (e.g., by issuing a format command). The formatting of the cluster identifies all of the computers in the cluster, established communication between the computers in the cluster, and enables the cluster to function as a unit.

At step 204, data is placed into the cluster (e.g., using a PUT command). When placing data into the cluster, the data is distributed onto the computers in the cluster such that each of the computers in the cluster contains a portion of the data. In this regard, using a PUT command, each machine/computer in the cluster may pull a set of multiple files for the data being added to the cluster. The server may arbitrarily assign the data that each machine receives (i.e., no particular order or sorting is obtained). Such an assignment may evenly distribute the chunks of data (with no sorting) and the server redistributes the newly added data regardless of which machines currently have/store the data. In addition, the PUT and GET command may be used in a distributed manner to max out available bandwidth when loading data sets into and out of clusters of computers.

At step 206, a map-reduce function to be executed by the map-reduce framework in the cluster is obtained.

As described above, embodiments of the invention perform the map function twice. Accordingly, at step 208, the first map function is performed. In the first map function, each of the computers in the cluster sorts the portion of the data stored on that computer. Based on the sorting, an abstraction that is a representation of the sorted portion of data is created by each computer. During map phase 208, each of the computers also exchange their abstractions with each other. Pursuant to the abstraction exchange, each computer merges the various extractions to create a complete abstraction that represents all of the data in the cluster. Accordingly, the first map phase 208 analyzes the keys as part of the (key,value) pairs and sorts them. Once sorted, the abstraction can be determined based on the sorted keys (e.g., the patterns found in the data set based on the keys).

Once sorted, if one-third (⅓) of the keys are left padded by three (3) bytes, ⅓ is right padded nulls, and ⅓ is completely random, the abstraction would represent such a pattern/data distribution. Thus, all of the keys are analyzed and sorted to provide an abstraction that represents the distribution of the data or patterns within the data. The abstraction generally comprises information that is less than 5 kilobytes per terabyte of data. Such an abstraction creation may recognize what is predominant in the data set and track it accordingly. In one or more embodiments, a developer (e.g., of the map-reduce function) may identify the portion of the data provides the necessary keys.

It may also be noted that the data in the cluster may be stored as big endian. In this regard, data that is not big endian may be converted into big-endian so that the data exists in a bytewise comparable form.

Accordingly, the sorting in step 208 may be performed in a variety of methods. For example, keys may be sorted in byte-ascending/descending order.

At step 210, the second map function is performed. The second map function conducts a search of the complete abstraction to determine a redistribution of the data across the computers in the cluster. Further, the second map function conducts a data exchange where each of the computers in the cluster obtains a portion of the data based on the determined redistribution and the complete abstraction. Such a redistribution may define ranges of (key,value) pairs that each of the computers in the cluster are responsible for.

At step 212, the reduce function is performed where each of the computers in the cluster perform, in parallel, the reduce function on the data based on the redistribution to produce a result. In the reduce function, all of the like keys are brought together from the multiple machines. For example, if a key is numeric, before the reduce function, different machines in the cluster may have (key,value) pairs with the same key. Thus, server A may have some pairs with a key of 5, server B may have some pairs with a key of 5, etc. After the reduce function 212, one of the servers is the owner of a particular key (e.g., key 5) and the reduce execution Accordingly, embodiments of the invention enable the performance of a fully sorted map-reduce function. The sorted output method sorts the data across the entire cluster in consistent timing regardless of how skewed the keys are but incurs consistent performance cost benefits. Accordingly, the sorting described above is immune to the skewing of the keys, is great for full-text index creation, is the easiest option when sorted results are desired, and is beneficially utilized for mega-cluster scaling.

Fault Tolerant Execution

One or more alternative embodiments of the invention further provide the ability to perform fault tolerant execution while maintaining consistent execution time. In this regard, embodiments provide the consistent execution time of speculative computing (where a cluster of a size appropriate for the application can be purchased) without incurring the wasted computing cycles incurred by full map-reduce speculative computing. If a hardware failure or corrupted file occurs during execution of a map-reducer, the faulty machine is excluded from the cluster and the remaining machines complete the lost work with negligible added execution time. The added execution time for fault-tolerant execution is a function of cluster size and is typically: added execution time=number of failures/cluster size.

To provide such capability, speculative computing is used in the mapper that produces redundant intermediate data sets bucketed as to which machine will pull the data. While every machine in the cluster is pulling intermediate data sets from every other machine, the machines also have redundant copies of every intermediate data set to failover if needed. If a failure occurs at any point after the map phase, the remaining machines rebucket their redundant intermediate (key,value) data sets that the failed machine was going to handle and all remaining machines complete the work instead at a higher thread priority. The number of failures that can be handled is one (1) less than the replication level of the distributed file system. For example, if replication is three (3), then a map-reducer can handle up to two failures during execution without interruption and failures may occur while recovering from previous failures without interruption of the map-reduce execution and with negligible added execution for most map-reducer jobs.

As an example, replication three (3) may be utilized where every tuple of data lives on three (3) different physical devices. When mapping through the data, speculative computing is therefore performed where three (3) different physical processors are performing the same execution and applying the same map function to the same tuple of data. Accordingly, if a failure occurs during the mapping, full recovery is possible. In addition, during the exchange phase (e.g., when data is redistributed), copies of every (key,value) pair exist on multiple machines so data can be pulled from multiple locations (including alternate locations in the event of a failure). If a failure occurs during a reduce operation, the failing machine is simply removed from the cluster and the point of execution can utilize the remaining machines to perform the processing. In this regard, the data on the failed machine may be redistributed to the remaining machines that merely have to load the (key,value) sets that the failed machine was assigned to process.

In addition to the above, a distributed daemon may be executing on all machines in a cluster. Such a daemon may continually identify and repair corrupt files suing replicated data across the cluster without interrupting executing map-reducer jobs. Further, a fault-tolerant job queue may be utilized for scheduling map-reduce jobs to execute first-in-first-out (FIFO) without having dependency on the uptime of any one machine in the cluster. Alternatively, a fault-tolerant schedule may be utilized that schedules map-reducer jobs to execute on timed intervals without dependency on the uptime of any one machine in the cluster.

Also, a plug-in architecture may be utilized to write hardware specific disk failure checks as an optional alternative to latency dependent fault-tolerance.

Additional/Alternative Embodiments

In addition to the above, alternative embodiments may provide for a memory only map-reduce, input, intermediate data and output of map-reduce job that is entirely in memory and pre-allocated prior to running the map-reduce job, a distributed-processed for managing individual map-reducer jobs running in parallel on a cluster, a jumbo-file viewer for scrolling through many terabytes of data across many machines, and utilizing speculative computing where a map-reducer job completes in the expected time frame even if a machine is lost during execution by incurring redundant execution in of all operations in advance.

Embodiments of the invention may also provide the ability to persist memory cache across the cluster. Thus, when data is placed into a particular computer in the cluster, it is cached (e.g., once processed by the reducer). Thereafter, when data is processed through the reducer during a subsequent execution, memory from cache may be merged with the newly processed data. Such persistence further provides the ability for a simplified replacement of a failed computer. In this regard, a failure of any machine in the cluster results in the replacing of the failed machine with a different machine. Such a replacing is performed as a single transaction (rather than a removal of an old machine followed by the subsequent addition of a new machine which would require multiple data redistributions). Using a single transaction, a redundant copy of the data (that was stored in the failed machine) is obtained from the remaining machines in the cluster and placed into the new machine. Accordingly, the distribution of the map-reduce function and data remains the same. To expedite such a process, redundant copies of the cluster wide configuration (i.e., which machine has which portions of data based on the redistribution from the second map function 210) may be cached/stored on multiple machines in the cluster.

In view of the above, multiple map-reduce functions may be performed serially. In one or more embodiments, the second execution of the map-reduce function may utilize the complete abstraction from the first execution to perform a deep graph traversal using a distributed binary search. Graph data from the execution of the first map-reduce function may be stored in a sorted form such that during subsequent executions, the graph data can be deeply traversed. In a particular mode of distributed deep graph traversal, any depth of relationships are optimally traversed regardless of skewing in the graphs structure by randomizing the physical location of graph nodes while maintaining the logical order of the graph. Further, while executing multiple map-reduce functions, embodiments may enable the use of a command that kills a single map-reduce execution without interrupting other executing map-reducers on the same cluster. Additional command may be available that allow a user to specify when a job or a category of map-reducers completes execution on the cluster.

Advantages of the such a sorted map-reduce execution include the ability to store large amounts of distributed memory with the performance of distributed direct access (e.g., directly accessing a (key,value) data set) without the bloated memory use of a distributed hash table. When data is fully sorted across a cluster, it may be directly loaded into memory where every machine may perform a binary search of the data (across the network if necessary). The sorting eliminates the need to create a distributed hash table that identifies the location of non-sorted data. In this regard, ADO-.NET may be used for random access to distributed memory from within the mapper and the reducer. Such use enables direct access to large memory sets (the aggregate of available memory in the cluster) allowing for deep graph traversal algorithms (as described above) to live within a sequence of map-reducer jobs. A hybrid of binary search and hash tables may be used for accessing (key,value) pairs in distributed memory. Such access may provide for O(log(n/256^2)/servercount) when installed on local area networks with dedicated non-blocking 10 for each instance.

In addition, during the second map function, a random-access look-up-table (LUT) may be used/created in the cluster. The LUT may identify the redistribution of the data and the aggregate available memory in the cluster. Thus, the LUT may be used by any of the machines in the cluster to perform a binary search of every other machine (e.g., during reduce step 212).

In addition to the above, embodiments of the invention may provide for the a query analyzer that is built into or on top of the map-reduce framework. Such a query analyzer may provide for the use of an ADO.NET data provider and structured query language (SQL) interface. In this regard, an SQL developer (without specific programming knowledge [e.g., of C#]) may utilize ADO.NET or an SQL interface to connect to the cluster 100 and issue an SQL statement. When an SQL command is entered, the command is converted into a map-reduce function. An SQL statement on a table (that is supported by an underlying file in the distributed file system/cluster 100) would execute a map-reducer job against the underlying file to produce intermediate or final results for the SQL statement. Such ADO.NET provider supports the use of a common API to enable ease of use across developers experienced in a variety of domains.

Further, custom SQL may provide the ability to provide access directly to data in a cluster in a low latency manner (e.g., if desire one line or tuple of a table). In this regard, it may be inefficient to perform a map-reduce job across an entire cluster when only a single tuple or line of data is desired. A special index can be used to pre-stage SQL data and look up a tuple in a low latency manner. For example, if an ADO.NET client requests data from a random machine that does not have such data, a master index may be returned to goes to other machines 104 in the cluster 100. Subsequent searches would potentially access the master index to access the particular machine controlling the data. An index is created on one machine 104 with data from all other machines 104 and the index is then published to other machines 104 in the cluster so that each machine 104 has a redundant copy of the index. Different selects may be performed on the index to determine the correct machine to utilize for a particular tuple of data. When the index is re-created or updated, the new index can then but updated into the master index.

Thus, standard SQL processing may be enabled in embodiments of the invention. In this regard, an SQL query (e.g., an ORDER BY clause) may be received in the cluster and translated, within the cluster and without additional user input, into a second map-reduce function. The second map-reduce function may then be performed on data in the cluster. Such use of standard SQL is only possible due to the sorting of the data across the cluster (e.g., data cannot be ordered if it is not sorted). Prior art SQL developers were required to be savvy to distributed computing concepts, such as partitioning types. Further, such use of SQL was not possible in prior art implementations of map-reduce. Further, the query optimizer of the present invention automatically (i.e., without additional user input) omits the translation from SQL to map-reduce when SQL operations involve small data sets that are more optimally done without distributed computation.

In view of the above, further embodiments of the invention may also include the following:

Map-reduce that only exchanges delta when sorting across a cluster;

Map-reduce which only exchanges delta when grouping across a cluster;

Protocol for debugging map-reduce on a cluster from any machine in the cluster;

Map-reduce debugger with skip-to-reduce option;

Map-reduce engine with built-in IDE/Debugger;

Map-reduce engine in which every machine is an equivalent entry-point;

Algorithm for evenly distributed sort without random sampling and regardless of skewing in data—MapMapReduce;

Algorithm for sorting distributed random data using all combinations of two bytes;

Algorithm for concurrently exchanging data between multiple servers;

SQL query analyzer which translates SQL into map-reducer jobs without non-SQL syntax;

Map-reduce Engine optimized for windows platform;

Map-reduce over NetBIOS;

Algorithm for data redundancy across a large cluster;

Distributed computing framework with just-in-time compiled and debug-able logic;

Distributed computing framework for combinations of parallel and map-reduce processing sequences;

64 Bit intermediate data addressing option for file-based map-reduce jobs, allowing a single (key,value) set to grow to the limits of a nodes hard disk drive; and Multiple heterogeneous inputs and outputs for map-reduce jobs. For example, multiple logical distributed input files may have different schemas into the same map-reducer jobs, then outputting multiple logical distributed output files each with different schemas.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for performing a sorted map-reduce job on a cluster comprising:
    (A) defining a cluster of two or more computers by:
        (1) installing a map-reduce framework onto each of the two or more computers; and
        (2) formatting the cluster by:
            (i) identifying the two or more computers in the cluster;

(ii) establishing communication between the two or more computers; and
(iii) enabling the cluster of two or more computers to function as a unit;
(B) placing data into the cluster, wherein:
(1) the data is distributed onto the two or more computers in the cluster; and
(2) each of the two or more computers in the cluster contains a portion of the data;
(C) obtaining a map-reduce function to be executed by the map-reduce framework on the cluster;
(D) performing a first map function of the map-reduce function, wherein the first map function comprises:
(1) each of the two or more computers sorting the portion of the data stored on that computer;
(2) each of the two or more computers creating an abstraction comprising a representation of the sorted portion of data stored on that computer;
(3) each of the two or more computers exchanging the abstractions; and
(4) each of the two or more computers merging the abstractions to create a complete abstraction representing all of the data in the cluster;
(E) performing a second map function of the map-reduce function, wherein the second map function comprises:
(1) conducting a search of the complete abstraction to determine a redistribution of the data across the two or more computers; and
(2) conducting a data exchange wherein each of the two or more computers obtains data based on the redistribution and complete abstraction; and
(F) performing a reduce function of the map-reduce function comprising each of the two or more computers performing, in parallel, the reduce function on the data obtained based on the redistribution to produce a result.

2. The computer-implemented method of claim 1, wherein: the data is placed into the cluster using a PUT command; and
each of the two or more computers in the cluster is assigned a portion of the data.

3. The computer-implemented method of claim 1, wherein the abstraction comprising a representation of the sorted portion of the data stored on that computer comprises is a less than 5 kilobytes per terabyte of data.

4. The computer-implemented method of claim 1, wherein, the redistribution defines a range of (key,value) pairs that each of the two or more computers will be responsible for.

5. The computer-implemented method of claim 1, wherein all of the data is stored as big endian.

6. The computer-implemented method of claim 1, further comprising persisting memory cache across the cluster wherein:
a failure of one of the two or more computers results in the replacing of the failed computer with a different computer;
the replacing is performed as a single transaction; and
a redundant copy of the data is obtained from remaining computers in the cluster.

7. The computer-implemented method of claim 1, comprising performing a second map-reduce function, wherein the second map-reduce function utilizes the complete abstraction to perform a deep graph traversal using a distributed binary search.

8. The computer-implemented method of claim 1, further comprising utilizing a random-access look-up-table (LUT) in the cluster, wherein the LUT identifies:
the redistribution of the data; and
aggregate available memory in the cluster.

9. The computer-implemented method of claim 1, further comprising:
receiving a structured query language (SQL) query in the cluster;
translating, within the cluster and without additional user input, the SQL query into a second map-reduce function; and
performing the second map-reduce function on the data in the cluster.

10. The computer-implemented method of claim 9, wherein the SQL query comprises an ORDER BY clause.

11. An apparatus for performing a sorted map-reduce job on a computer cluster comprising:
(A) a computer cluster comprising two or more computers;
(B) a map-reduce framework installed onto each of the two or more computers, wherein:
(1) the map-reduce framework defines the cluster;
(2) the cluster is formatted by:
(i) identifying the two or more computers in the cluster;
(ii) establishing communication between the two or more computers; and
(iii) enabling the cluster of two or more computers to function as a unit;
(C) data that is placed into the cluster, wherein:
(1) the data is distributed onto the two or more computers in the cluster; and
(2) each of the two or more computers in the cluster contains a portion of the data;
(D) a map-reduce function configured to be executed by the map-reduce framework on the cluster;
(E) a first map function of the map-reduce function, wherein the first map function comprises:
(1) each of the two or more computers sorting the portion of the data stored on that computer;
(2) each of the two or more computers creating an abstraction comprising a representation of the sorted portion of data stored on that computer;
(3) each of the two or more computers exchanging the abstractions; and
(4) each of the two or more computers merging the abstractions to create a complete abstraction representing all of the data in the cluster;
(F) a second map function of the map-reduce function, wherein the second map function comprises:
(1) conducting a search of the complete abstraction to determine a redistribution of the data across the two or more computers; and
(2) conducting a data exchange wherein each of the two or more computers obtains data based on the redistribution and complete abstraction; and
(G) a reduce function of the map-reduce function, wherein the reduce function comprises each of the two or more computers performing, in parallel, the reduce function on the data obtained based on the redistribution to produce a result.

12. The apparatus of claim 11, wherein:
the data is placed into the cluster using a PUT command; and
each of the two or more computers in the cluster is assigned a portion of the data.

13. The apparatus of claim 11, wherein the abstraction comprising a representation of the sorted portion of the data stored on that computer comprises is a less than 5 kilobytes per terabyte of data.

14. The apparatus of claim 11, wherein, the redistribution defines a range of (key,value) pairs that each of the two or more computers will be responsible for.

15. The apparatus of claim 11, wherein all of the data is stored as big endian.

16. The apparatus of claim 11, further comprising persisting memory cache across the cluster wherein:
- a failure of one of the two or more computers results in the replacing of the failed computer with a different computer;
- the replacing is performed as a single transaction; and
- a redundant copy of the data is obtained from remaining computers in the cluster.

17. The apparatus of claim 11, further comprising a second map-reduce function, wherein the second map-reduce function utilizes the complete abstraction to perform a deep graph traversal using a distributed binary search.

18. The apparatus of claim 11, further comprising a random-access look-up-table (LUT) in the cluster, wherein the LUT identifies:
- the redistribution of the data; and
- aggregate available memory in the cluster.

19. The apparatus of claim 11, further comprising a query optimizer configured to:
- receive a structured query language (SQL) query in the cluster;
- translate, within the cluster and without additional user input, the SQL query into a second map-reduce function; and
- perform the second map-reduce function on the data in the cluster.

20. The apparatus of claim 19, wherein the SQL query comprises an ORDER BY clause.

21. A system for performing a sorted map-reduce job on a computer cluster comprising:
- (A) a computer cluster comprising two or more computers that are communicatively coupled to each other enabling the cluster to function as a unit;
- (B) a map-reduce framework installed onto each of the two or more computers;
- (C) data distributed across the cluster such that each of the two or more computers in the cluster contains a portion of the data;
- (D) a map-reduce function configured to be executed by the map-reduce framework on the cluster;
- (E) a first map function of the map-reduce function, wherein the first map function comprises:
  - (1) each of the two or more computers sorting the portion of the data stored on that computer;
  - (2) each of the two or more computers creating an abstraction comprising a representation of the sorted portion of data stored on that computer;
  - (3) each of the two or more computers exchanging the abstractions; and
  - (4) each of the two or more computers merging the abstractions to create a complete abstraction representing all of the data in the cluster;
- (F) a second map function of the map-reduce function, wherein the second map function comprises:
  - (1) conducting a search of the complete abstraction to determine a redistribution of the data across the two or more computers; and
  - (2) conducting a data exchange wherein each of the two or more computers obtains data based on the redistribution and complete abstraction; and
- (G) a reduce function of the map-reduce function, wherein the reduce function comprises each of the two or more computers performing, in parallel, the reduce function on the data obtained based on the redistribution to produce a result.

22. The system of claim 21, wherein:
- the data is placed into the cluster using a PUT command; and
- each of the two or more computers in the cluster is assigned a portion of the data.

23. The system of claim 21, wherein the abstraction comprising a representation of the sorted portion of the data stored on that computer comprises is a less than 5 kilobytes per terabyte of data.

24. The system of claim 21, wherein, the redistribution defines a range of (key,value) pairs that each of the two or more computers will be responsible for.

25. The system of claim 21, wherein all of the data is stored as big endian.

26. The system of claim 21, further comprising persisting memory cache across the cluster wherein:
- a failure of one of the two or more computers results in the replacing of the failed computer with a different computer;
- the replacing is performed as a single transaction; and
- a redundant copy of the data is obtained from remaining computers in the cluster.

27. The system of claim 21, further comprising a second map-reduce function, wherein the second map-reduce function utilizes the complete abstraction to perform a deep graph traversal using a distributed binary search.

28. The system of claim 21, further comprising a random-access look-up-table (LUT) in the cluster, wherein the LUT identifies:
- the redistribution of the data; and
- aggregate available memory in the cluster.

29. The system of claim 21, further comprising a query optimizer configured to:
- receive a structured query language (SQL) query in the cluster;
- translate, within the cluster and without additional user input, the SQL query into a second map-reduce function; and
- perform the second map-reduce function on the data in the cluster.

30. The system of claim 29, wherein the SQL query comprises an ORDER BY clause.

* * * * *